3,738,907
THERMOPLASTIC LAMINATES BONDED TOGETHER BY BLOCK COPOLYMERS

Klaus Bronstert, Carlsberg, Alfred Hofmann, Bobenheim-Roxheim, and Gerhard Fahrbach and Volker Ladenberger, Schwetzingen, Germany, assignors to Badische Anilin- & Soda-Fabrik Aktiengesellschaft, Ludwigshafen, Germany
No Drawing. Filed May 24, 1971, Ser. No. 146,448
Int. Cl. B32b 15/08, 27/32
U.S. Cl. 161—217  3 Claims

ABSTRACT OF THE DISCLOSURE

Laminates consisting of at least two thermoplastics bonded together by an adhesive. The adhesive is a block copolymer of the Formula A—B, in which A is a polyvinylaromatic block and B is a polyolefin block. The laminates may be used in the manufacture of domestic appliances, in the automobile industry or for packaging applications.

---

This invention relates to laminates comprising at least two thermoplastics bonded together by two-block copolymers.

Most of the conventional adhesives are unsuitable for bonding thermoplastics because either they provide an inadequate bond or they have a solvent action on the thermoplastic.

German printed application No. 1,569,423 discloses adhesives for bonding plastics materials based on polyolefins, which adhesives consist of three-block copolymers of the Formula A—B—A, in which A is a non-elastomeric polyvinylcycloalkane block and B is an elastomeric polyolefin block. These adhesives are prepared by hydrogenating three-block copolymers of vinylarenes and conjugated dienes to the highest possible degree. Although they provide a bond between polyolefin plastics, this bond is not strong enough for many applications.

It is therefore an object of the invention to provide improved adhesives for bonding thermoplastics.

The present invention relates to laminates consisting of at least two thermoplastics which may be identical or different and which are bonded together by an adhesive. The adhesive is a block copolymer of the Formula A—B, in which A is a polyvinylaromatic block having a molecular weight of from 10,000 to 150,000 and
B is a polyolefin block which has a molecular weight of from 10,000 and 100,000 and in which not more than 10% of the carbon-carbon bonds are olefinically unsaturated, the molar ratio of A to B being from 10:90 to 70:30.

Such adhesives provide a much better bond between the plastics materials than prior art three-block copolymers. In addition, these two-block copolymers are much simpler to produce than three-block copolymers.

The adhesives of the invention may be used for bonding conventional thermoplastics such as olefin polymers, for example high-pressure and low-pressure polyethylene, polypropylene and copolymers of ethylene and propylene; styrene polymers such as polystyrene and copolymers of styrene with α-methylstyrene or other substituted styrenes, which polymers may, if desired, be modified by elastomers to improve their impact strength. The adhesives are particularly suitable for bonding styrene polymers to olefin polymers. One method of bonding metals, preferably aluminum, to styrene polymers comprises preparing a conventional laminate of metal and a copolymer based on ethylene, minor quantities of acrylic acid, acrylate and isobutylene and then bonding the copolymer layer to the styrene polymer with the aid of the two-block copolymer. Alternatively, the two polymers may be mixed and the resulting mixture used as adhesive.

According to the invention two-block copolymers of the Formula A—B are used as adhesives. Block A is a polyvinylaromatic block having a molecular weight between 10,000 and 150,000, preferably between 20,000 and 80,000. Block B is a polyolefin block having a molecular weight between 10,000 and 100,000, preferably between 20,000 and 100,000. The molar ratio of A to B is from 10:90 to 70:30, preferably from 30:70 to 60:40. One particular method of preparing the two-block copolymer consists in the selective hydrogenation of a block copolymer A—B in which the block A is a polyvinylaromatic block and block B is a poly-1,3-diene block. Such two-block copolymers may be manufactured by conventional processes, for example by first polymerizing a vinylaromatic monomer in hydrocabon solution using a lithium alkyl catalyst and then continuing polymerization at the living end of the chain with a 1,3-diene monomer. An alternative process for the manufacture of two-block copolymers is to polymerize a mixture of vinylaromatics and 1,3-dienes in hydrocarbon solvents in the presence of lithium alkyl catalysts. In this process there is first formed a polydiene block containing small amounts of vinylaromatic compound and then there is formed a vinylaromatic block containing small amounts of diene units in the initial portion of the chain. Of the vinylaromatics which may be used styrene is particularly suitable; it may be mixed with α-methylstyrene or other nuclearly alkylated styrenes. Examples of suitable 1,3-dienes are butadiene, isoprene and piperylene or mixtures thereof.

The hydrogenation of the two-block copolymers A—B may also be carried out by conventional methods, preferably using catalyst complexes of compounds of iron, nickel or cobalt with aluminum alkyls. When hydrogenation is carried out under mild conditions, selectively hydrogenated products are obtained in which the double bonds of the vinylaromatic compound have not been attacked whilst those of the polydiene component have been hydrogenated. The properties of the product are not impaired if up to 10% of the double bonds originally present in the polydiene block B are not hydrogenated.

The plastics materials to be bonded and the adhesives themselves may contain conventional additives such as fillers, asbestos fibers, pigments, plasticizers and flow improvers.

Bonding of the two layers of plastics materials with the adhesives of the invention is preferably carried out by sandwiching a film of the two-block copolymer between the layers to be bonded and applying pressure to the assembly for a short period with heating. The thickness of the film may vary from 5 to 300μ; the temperature during the pressing operation should be above 140° C., preferably between 180° and 240° C. Alternatively, one of the plastics layers may be coated with a solution or emulsion of the two-block copolymer and, after evaporation of the solvent, applied to the other plastics layer, the two layers being bonded together with the application of heat and pressure.

When using the adhesives of the invention, it is not necessary to prepare the surfaces to be bonded by degreasing or oxidation.

The invention is further illustrated by the following examples.

EXAMPLE 1

In each experiment, a 3 mm. thick sheet of polypropylene was bonded to a 5 mm. thick sheet of polystyrene with an adhesive, in the form of a 100µ thick film, prepared from various block copolymers. The sheets were pressed together for 3 minutes at a temperature of 200° C. under a pressure of from 0.5 to 2 atmospheres gauge.

Table I below lists the various block copolymers and the tensile shear strengths of the finished laminates.

TABLE I

| Block copolymer | Mol. wt. | Tensile shear strength, kg./cm.² |
|---|---|---|
| Selectivity hydrogenated styrene-butadiene | 120,000 | 58 |
| Completely hydrogenated styrene-butadiene | 130,000 | 25 |
| Completely hydrogenated styrene-butadiene-styrene | 110,000 | 48 |

The tensile shear strengths were determined as follows: Strips of the plastics materials, 1 cm. in width, were bonded together in such a way that they overlapped over an area of 1 cm.², the unbonded portions projecting at either end. The projecting ends were held in grips, the power-actuated grip applying tension at a rate of 100 mm./min. The force required to separate the strips was measured.

EXAMPLE 2

In a press a 3.0 mm. thick sheet of an ethylene homopolymer (density 0.918 g./cm.³) (layer 1) is covered with a 0.1 mm. thick film (layer 2) which consists of a selectively hydrogenated styrene-butadiene two-block copolymer having a molecular weight of 120,000 and a monomer molar ratio of 50:50. A 3.0 mm. thick sheet of styrene homopolymer (layer 3) is placed on layer 2 and the assembly is subjected to a pressure of 0.1 kg./cm.² for 3 minutes at a temperature of 180° C. to form a sandwich construction in which the individual layers are intimately bonded together. The laminate is removed from the press at a temperature of 30° C. The bond strength of the individual layers is greater than the tensile strength of the polystyrene.

EXAMPLE 3

In a press a 3.0 mm. thick sheet of an ethylene homopolymer (density 0.960 g./cm.³) (layer 1) is covered with a 0.15 mm. thick film (layer 2) consisting of a selectively hydrogenated styrene-butadiene two-block copolymer having a molecular weight of 120,000 and a monomer molar ratio of 50:50. On layer 2 there is placed a 3.0 mm. thick sheet of a propylene homopolymer (density 0.896 g./cm.³) (layer 3), and the assembly is subjected to a pressure of 0.3 kg./cm.² for 2 minutes at a temperature of 190° C. to form a sandwich construction in which the individual layers are intimately bonded together. The laminate is removed from the press at a temperature of 50° C. and cooled to room temperature without the application of pressure. In the tensile shear test the outer layers failed without delamination occurring.

EXAMPLE 4

In a press a 0.6 thick sheet of aluminum (layer 1) is covered with a 0.15 mm. thick film (layer 2) consisting of the following mixture:

(a) 20 parts of a quaternary polymer containing 90.4 parts by weight of ethylene units, 4.0 parts by weight of acrylic acid units, 4.1 parts by weight of tert-butyl acrylate units and 1.5 parts by weight of isobutylene units, and (b) 80 parts of a selectively hydrogenated styrene-butadiene two-block copolymer having a molecular weight of 135,000 and a monomer molar ratio of 50:50.

A styrene homopolymer sheet, 4 mm. thick, (layer 3) is placed on layer 2, a 0.15 mm. thick film (layer 4) similar to layer 2 is placed on layer 3 and a 0.6 mm. thick sheet of aluminum (layer 5) is placed on layer 4. The assembly is then subjected to a pressure of 0.5 kg./cm.² for 2 minutes at a temperature of 200° C. to form a sandwich construction in which the individual layers are intimately bonded together. The multilayer laminate is removed from the press at a temperature of 20° C. These sandwich elements of low specific gravity and high rigidity are suitable for a number of applications in the building and furniture industries. In the test for determining the stripping strength according to ASTM D 1781–62 peel torques of more than 16 kg. cm./cm. are obtained.

EXAMPLE 5

In a press the following layers are placed on top of each other:

(1) a 0.5 mm. thick sheet of aluminum as bottom layer;
(2) a 0.1 mm. thick film of a quaternary polymer consisting of 86.3 parts by weight of ethylene units, 3.8 parts by weight of acrylic acid units, 8.2 parts by weight of tert-butyl acrylate units and 1.7 parts by weight of isobutylene units;
(3) a 0.1 mm. thick film of a selectively hydrogenated styrene-butadiene two-block copolymer having a molecular weight of 120,000 and a monomer molar ratio of 50:50;
(4) a 4 mm. thick sheet of a styrene homopolymer;
(5) a 0.1 mm. thick film similar to layer 3;
(6) a 0.1 mm. thick film similar to layer 2, and
(7) a 0.5 mm. thick sheet of aluminum as top layer.

The assembly is then subjected to a pressure of 0.5 kg./cm.² for 2 minutes at 180° C. to form a sandwich construction in which the individual layers are intimately bonded together. The resulting building element has very good flexural strength and its individual layers show tensile shear strengths of more than 56 kg./cm.²

We claim:

1. Laminates consisting of at least two thermoplastics which may be identical or different in composition and which are bonded together with an adhesive, wherein the adhesive consists of two-block copolymer of the Formula A—B, where A is a polyvinylaromatic block having a molecular weight between 20,000 and 80,000, and
B is a polyolefin block which has a molecular weight between 20,000 and 100,000 and in which not more than 10% of the carbon-carbon bonds are olefinically unsaturated, the molar ratio of A to B being from 10:90 to 70:30.

2. Laminates as in claim 1 wherein the laminate includes a styrene polymer bonded to an olefin polymer.

3. Laminates comprising at least three layers consisting of
  (i) aluminum;
  (ii) (a) an ethylene copolymer as conventional adhesive,
       (b) a two-block copolymer of the Formula A—B as in claim 1 as an adhesive; and
  (iii) a styrene polymer, the adhesives (a) and (b) being present either as separate layers or blended to form a single layer.

(References on following page)

References Cited
UNITED STATES PATENTS

| | | | |
|---|---|---|---|
| 3,242,038 | 3/1966 | Dallas et al. | 161—253 |
| 3,439,064 | 4/1969 | Makowski et al. | 161—255 X |
| 3,402,086 | 9/1968 | Smith et al. | 161—216 X |
| 2,994,632 | 8/1961 | Brown et al. | 161—254 X |
| 3,111,451 | 11/1963 | Peters | 161—216 |
| 3,239,478 | 3/1966 | Harlan | 161—217 |
| 3,264,168 | 8/1966 | Sneary | 161—253 X |
| 3,403,072 | 9/1968 | Wheat | 161—253 |
| 3,582,449 | 6/1971 | Stolki et al. | 161—216 |
| 3,658,635 | 4/1972 | Eustice | 161—218 |
| 3,594,252 | 7/1971 | Weinberg | 161—255 X |
| 3,682,768 | 8/1972 | Adams et al. | 161—253 |

HAROLD ANSHER, Primary Examiner

U.S. Cl. X.R.

161—253, 255

UNITED STATES PATENT OFFICE
CERTIFICATE OF CORRECTION

Patent No. 3,738,907      Dated June 12, 1973

Inventor(s) Klaus Bronstert et al

It is certified that error appears in the above-identified patent and that said Letters Patent are hereby corrected as shown below:

Column 1, line 9, insert -- Claims priority, application Germany, June 12, 1970, P 20 29 028.2 --.

Signed and sealed this 20th day of November 1973.

(SEAL)
Attest:

EDWARD M. FLETCHER, JR.
Attesting Officer

RENE D. TEGTMEYER
Acting Commissioner of Patents